Patented Oct. 9, 1934

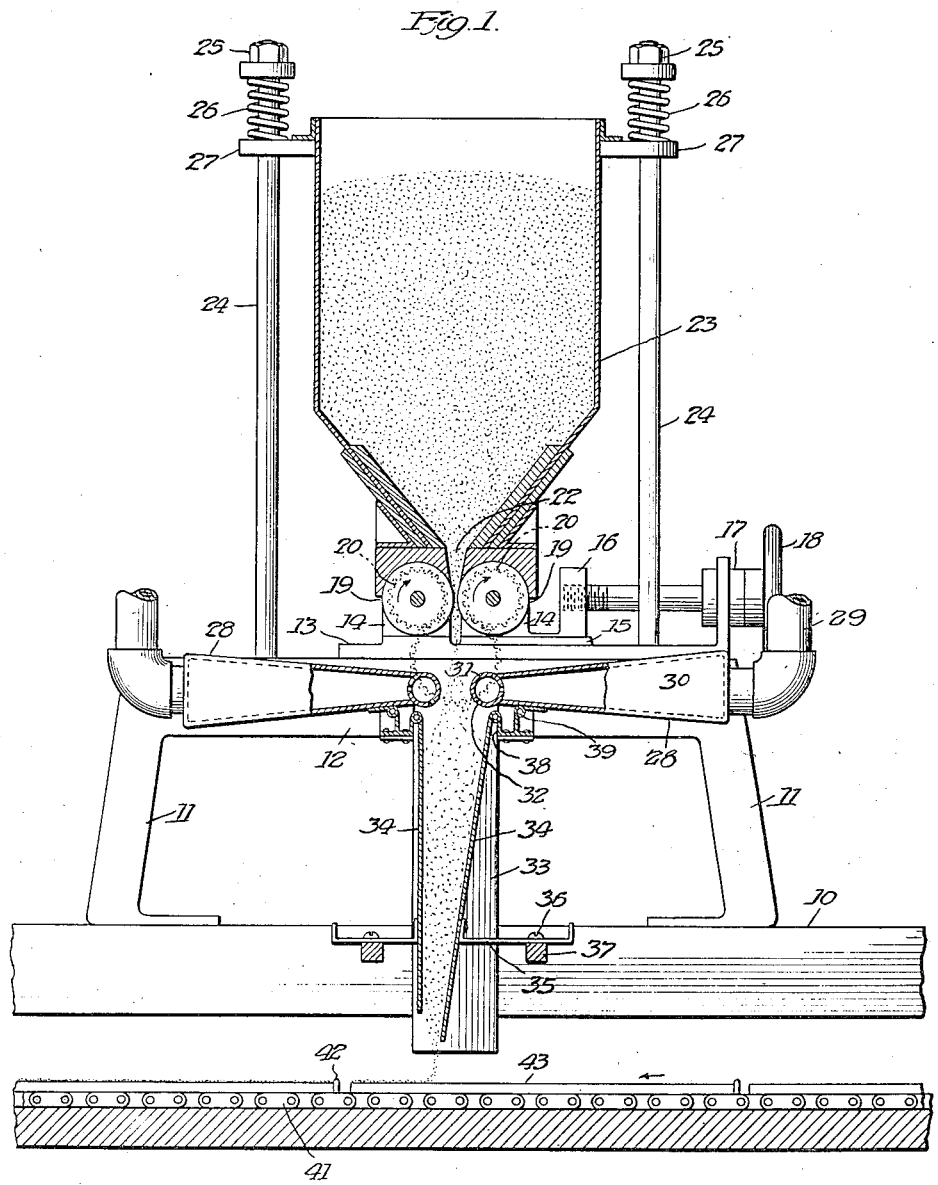

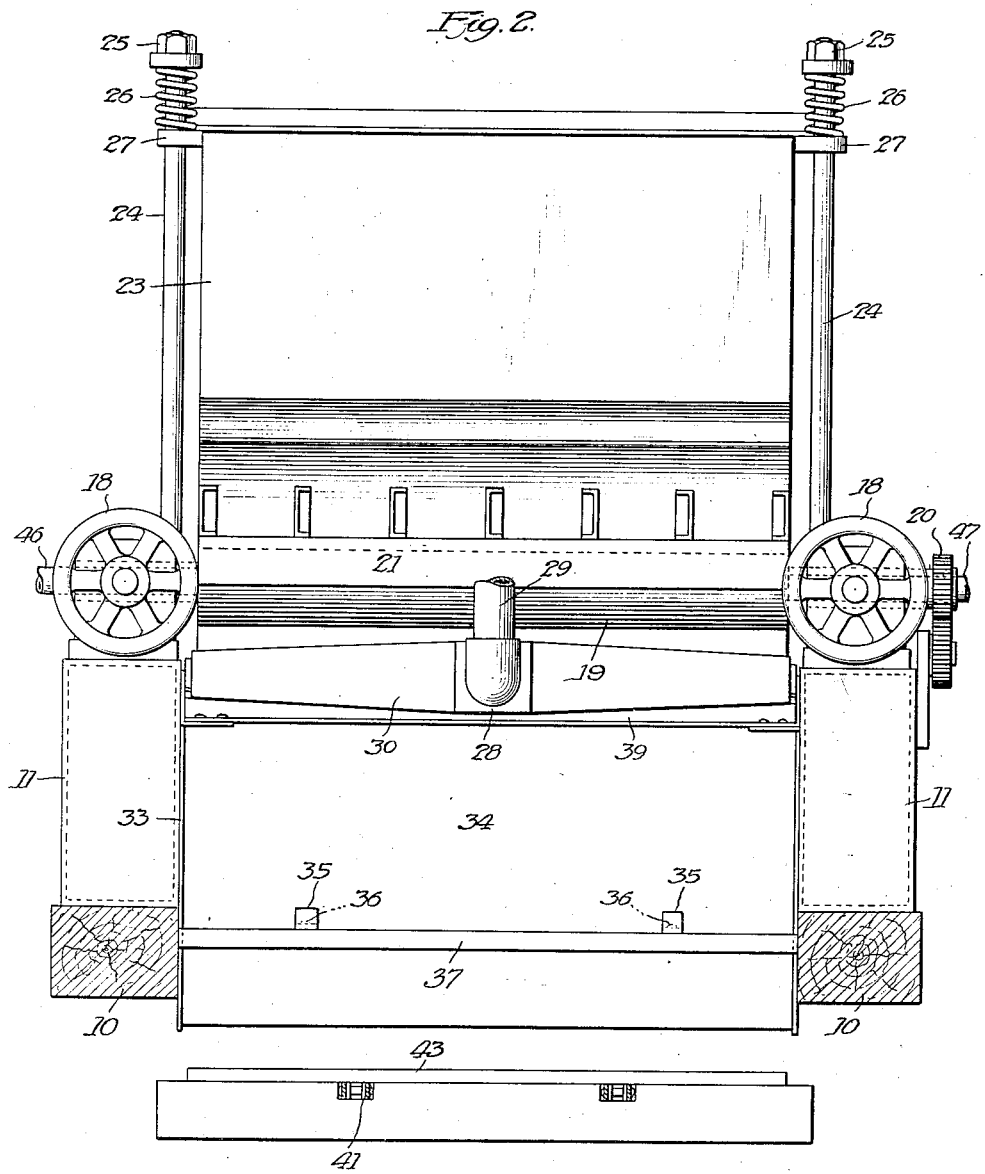

1,976,055

UNITED STATES PATENT OFFICE 1,976,055

PROCESS FOR MAKING PLY-BOARD

Cornelius B. Woodward and Robert B. Keefe, Chicago, and Edwin W. Colt, Glen Ellyn, Ill., assignors to Armour and Company, Chicago, Ill., a corporation of Illinois Original application September 17, 1931, Serial No. 563,350. Divided and this application November 2, 1932, Serial No. 640,856

2 Claims. (Cl. 144—309)

The present invention relates to the distribution of materials, and has particular reference to a process for distributing finely divided solid particles of adhesive materials upon an appropriate carrier such as wet veneer sheets in the manufacture of ply-board; this application being a division of our co-pending application Serial No. 563,350 filed September 17, 1931.

A principal object of our invention is a process for providing a uniform and controlled covering of a finely divided dry adhesive material upon a carrier. An additional object is to coat a wet carrier, such as veneer sheets, with powdered blood albumen to form thereon an adhesive surface, in preparation for joining the sheets in multiple superimposed relation as ply-board. These and other objects will become apparent from a consideration of the following description.

Difficulty has been experienced in obtaining uniform adherence between veneer sheets in the ply-board built up therefrom where, as has hitherto been customary, a liquid adhesive such as glue is applied to the sheets and they are then superimposed and subjected to sustained pressure. The drying of the product is prolonged, blisters are prone to form between the layers, and a defective product is likely to result.

The employment of adhesive in dry form has not been successfully attained to our knowledge, largely due to difficulties in distribution. That is to say, it has been difficult to distribute powdered or granular materials evenly by an air blast or spray upon a surface to which such materials will uniformly adhere. This is particularly true in the case of the application of powdered adhesive materials, such as blood albumen, to wet veneer sheets.

In accordance with our invention, the finely divided adhesive material is passed from an appropriate hopper through spaced rollers, whereby an accurately determined amount of material is obtained. The powdered or granular material is allowed to fall into and through a zone of turbulent air. As a result an even distribution of the individual particles in the air is obtained as a dust-laden cloud. The particle charged air is then directed downwardly onto an appropriate carrier upon which it is desired to effect a distribution of the solid particles, primarily by settling as distinguished from an air blast or spray.

In the drawings:

Fig. 1 is an end elevation, partly in section of apparatus suitable for coating ply-board sheets with powdered albumen; and Fig. 2 is a side elevation of the device shown in Fig. 1.

In the embodiment of the invention shown in the drawings, the frame structure of the apparatus is composed of timbers 10 having upwardly extending supporting members 11 which are connected by the horizontal bars 12.

Oppositely disposed on the bars 12 are adjustable bearing supporting members 13 having mounted thereon bearings 14. On each of the bearing supporting members 13 is provided a slidable bearing support 15 having an upwardly extending projection 16. This projection is provided with an opening into which is threaded the shaft of a micrometer adjusting device 17 having a hand-operated wheel 18. It is evident that by turning the wheel in one direction the slidable bearing support is caused to move forward while rotation of the wheel in the opposite direction effects a retraction of said slidable bearing support.

Mounted in the corresponding bearings 14 of the oppositely disposed bearing supporting members 13 are rollers 19. These rollers are driven by driven gears 20 meshing with a suitable driving gear, and their direction of rotation is clockwise, as shown by the arrows in Fig. 1. The direction of rotation may, however, be regulated in accordance with operating factors such as the size or nature of the material being distributed and speed of operation of the apparatus.

It is evident that by regulating the micrometer adjusting mechanism, the distance between the rolls may be varied, thereby accurately controlling the amount of materials which will pass therebetween. To produce an even distribution it is desirable to synchronize the two micrometer adjusting devices in order to insure a uniform space between the rollers.

In the distribution of finely divided materials, particularly those tending to become adhesive in the presence of moisture, it is desirable to provide the rollers 19 with heating means to insure against agglomeration. As shown in Fig. 2, the hollow rollers may be provided in such instances with an inlet steam pipe 46 and an outlet or condensate pipe 47. The rollers are thus maintained at a sufficiently elevated temperature to preclude collection of moisture thereon, or to impart the desired elevation of temperature to the material being distributed.

Mounted upon rolls 19 are semi-circular bearing sleeves 21 which form a rigid support for the feed hopper 23. The feed hopper is provided with a sloping bottom terminating in an opening 22 which is located directly above the opening between rolls 19.

Extending vertically from bars 12 of the frame are rods 24 having nuts 25 and springs 26 positioned about the upper portions thereof. The bottom of springs 26 rest against the top of ears 27 through which rods 24 extend. Ears 27 are rigidly secured to the top of the feed hopper to form a support for the latter.

It is desirable that the hopper rest firmly against the feed rollers. The weight of the hopper and its contents assist in this respect, but it is preferred to regulate nuts 25 so that springs 26 exert pressure to the ears 27, thereby pressing the feed hopper downwardly against the rolls.

Directly beneath the opening between the feed rollers are positioned air lines 28. These lines consist of supply pipes 29, extended manifold chambers 30, and nozzle portions 31, the latter being provided with outlet openings 32.

The air lines 28 direct converging streams of air meeting substantially in the axis of an adjustable discharge hopper which is made up of downwardly extending end plates 33, and adjustable side plates 34 forming a chute of large area relative to that of the opening 32. Adjustment of the side plates is effected by regulating the position of bars 35 with respect to clamping screws 36, the latter being rigidly supported by bars 37 which are mounted on timbers 10 of the frame.

Where operation of the apparatus is constant it may be desirable to omit adjustment of the discharge hopper, but it is preferred to adjust at least one of the sides 34 in accordance with any particular operating conditions.

The side plates 34 are pivoted at their upper portion by means of hinges 38, the stationary portions of which are secured to the frame structure.

Hinges 39 are secured to the frame structure and to the expansion or manifold chambers 28, whereby said chambers may be pivoted to change or adjust the direction of the dust-laden cloud through the discharge hopper.

In addition, hinges 38 and 39 cooperate, as shown in Figs. 1 and 2, to form a substantially dust tight connection between the air lines and the discharge hopper. These hinges and end plates 33 reduce loss of air and material being distributed to a minimum.

A traveling mechanism is mounted in the path of travel of the cloud of adhesive and air issuing from the discharge hopper, and serves to convey past the discharge hopper a carrier upon which it is desired to distribute the cloud of finely divided materials. The embodiment shown in the drawings is particularly adapted for the coating of ply-board sheets with powdered albumen, and consists of a stationary frame 40 having traveling chains 41 mounted thereon. Stops 42 may be provided to insure traction between the chains and the ply-board, the latter being illustrated at 43.

As the angle of contact between the sheet and the dust-laden air from the discharge hopper approaches 90° a larger and more closely packed amount of particles will be deposited upon the carrier.

In operation, the feed hopper is filled with finely divided or powdered adhesive materials, such as powdered glue or blood albumen. The feed rollers are then rotated to supply a curtain-like stream of solid particles to the discharge hopper. As these particles enter the discharge hopper they come in contact with streams of air from air nozzles 32. Consequently the particles are caught by the somewhat turbulent air streams and incorporated therein as a dust-laden cloud. By the time the air has reached the outlet end of the discharge hopper, the solid particles are evenly distributed therein, and when the cloud of air and solids settles upon the wet ply-board or other carrier having an affinity for the solid particles, an evenly distributed coating results.

The wet ply-board sheet supplies to the dry blood albumen powder deposited thereon sufficient moisture to effect a tacky coating; and the damp coated sheets, delivered by the machine, are superimposed in the desired number of layers and subjected to the action of presses known in the art to produce the finished, dry, permanently bonded ply-board.

It is important for obtaining the best results that the operation of the apparatus be maintained as constant as possible.

It is also desirable that the apparatus be sufficiently rigid to prevent an inconstant flow of materials. The firm seating of the feed hopper upon the feed rolls materially assists in this respect.

The micrometer adjustment of the feed rolls allows an accurate control of the distance therebetween. As the distance between the rolls may be only a few thousandths of an inch, a small variation will be reflected by a change in the character of the finished product.

In a compressed air mechanism the pressure and consequently the supply of air is apt to fluctuate with fluctuations in the compression apparatus. It will be seen that such fluctuations in the air stream results in a finished product which is not of constant character. It is our discovery that such fluctuations in the air supply may be offset by employing two air streams such as the converging streams shown in the drawings and commingling the air and solid particles in the form of a cloud within the confines of a discharge hopper of relatively large area.

In a desirable mode of operation, one of the air nozzles is provided with openings sufficiently large to supply the requisite amount of air for properly distributing the materials while the other air nozzle is merely "cracked", that is, it is provided with small openings whereby a limited quantity of air is blended with the major air stream. This small air stream has a steadying influence upon the major air stream and permits an even distribution of the finely divided materials.

In normal operation, the air pressure employed may be between one and ten pounds, depending upon the result desired.

The air issuing from the nozzles is intermingled and deflected from the sides of the discharge hopper to create sufficient turbulence to insure even distribution of the solid particles therein. The sides of the discharge hopper, act to a certain extent as baffles. Other baffle arrangements may be used if desired.

By pivoting the sides of the discharge hopper at their upper portion, the cross sectional area of the hopper may be reduced toward the outlet end, to increase the speed of the particle-containing air. Once the desired position is determined the same may be maintained constant by tightening the clamping screw 36.

From the foregoing illustrative description it will be seen that our process is susceptible of various changes, also that it is adaptable to the coating of other than veneer sheets, as for instance in the manufacture of sandpaper; wherefore such modifications as come within the spirit of our invention are intended to be included in the appended claims.

We claim:

1. The process for making ply-board which comprises directing a measured quantity of dry powdered adhesive downwardly through a restricted passage to form a curtain of the material, directing a stream of air against the curtain to create a turbulent powder-laden stream of air, passing the turbulent stream of powder-laden air through a restricted passage, passing a dampened sheet of veneer in the path of the powder-laden air issuing from the restricted passage to coat the sheet of veneer, superimposing the coated sheet of veneer with another sheet of veneer, and applying pressure thereto.

2. The process for making ply-board which comprises allowing a measured quantity of dry powdered adhesive passing through a restricted passage to fall and form a curtain of the material, directing converging streams of air into the path of the falling curtain to create a turbulent powder-laden stream of air, passing the turbulent stream of powder-laden air through a restricted passage, directing the stream of powder-laden air against a damp sheet of veneer to coat the sheet, superimposing a second sheet of veneer on the said first named sheet of veneer, and applying pressure thereto.

CORNELIUS B. WOODWARD.
ROBERT B. KEEFE.
EDWIN W. COLT.